United States Patent
Zhamu et al.

(10) Patent No.: US 10,850,496 B2
(45) Date of Patent: Dec. 1, 2020

(54) CHEMICAL-FREE PRODUCTION OF GRAPHENE-REINFORCED INORGANIC MATRIX COMPOSITES

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 736 days.

(21) Appl. No.: 14/998,729

(22) Filed: Feb. 9, 2016

(65) Prior Publication Data

US 2017/0225233 A1 Aug. 10, 2017

(51) Int. Cl.
*C30B 29/00* (2006.01)
*B33Y 70/00* (2020.01)
(Continued)

(52) U.S. Cl.
CPC ............... *B33Y 70/00* (2014.12); *B22F 1/02* (2013.01); *B22F 3/1055* (2013.01); *B33Y 10/00* (2014.12);
(Continued)

(58) Field of Classification Search
None
See application file for complete search history.

(56) References Cited

U.S. PATENT DOCUMENTS

| 6,872,330 B2 | 3/2005 | Mack et al. |
| 7,071,258 B1 | 7/2006 | Jang et al. |
| (Continued) | | |

FOREIGN PATENT DOCUMENTS

| CN | 102225759 A | 10/2011 |
| WO | 2014210584 A1 | 12/2014 |
| (Continued) | | |

OTHER PUBLICATIONS

Ting He et al. (Preparation andConsolidation of Alumina/Graphene composite powders, 2009.). (Year: 2009).*
(Continued)

*Primary Examiner* — Colin W. Slifka
*Assistant Examiner* — Colette B Nguyen

(57) ABSTRACT

Provided is a simple, fast, scalable, and environmentally benign method of producing a graphene-reinforced inorganic matrix composite directly from a graphitic material, the method comprising: (a) mixing multiple particles of a graphitic material and multiple particles of an inorganic solid carrier material to form a mixture in an impacting chamber of an energy impacting apparatus; (b) operating the energy impacting apparatus with a frequency and an intensity for a length of time sufficient for peeling off graphene sheets from the graphitic material and transferring the graphene sheets to surfaces of solid inorganic carrier material particles to produce graphene coated or graphene-embedded inorganic particles inside the impacting chamber; and (c) forming graphene-coated or graphene-embedded inorganic particles into the graphene-reinforced inorganic matrix composite. Also provided is a mass of the graphene-coated or graphene-embedded inorganic particles produced by this method.

27 Claims, 7 Drawing Sheets

(51) Int. Cl.
- C03C 14/00 (2006.01)
- B22F 3/105 (2006.01)
- B33Y 10/00 (2015.01)
- C22C 26/00 (2006.01)
- B22F 1/02 (2006.01)
- C22C 1/10 (2006.01)
- C22C 49/14 (2006.01)
- C22C 47/14 (2006.01)

(52) U.S. Cl.
CPC .......... *C03C 14/008* (2013.01); *C22C 1/1084* (2013.01); *C22C 26/00* (2013.01); *C22C 47/14* (2013.01); *C22C 49/14* (2013.01); *B22F 2998/10* (2013.01); *C03C 2214/17* (2013.01); *Y02P 10/295* (2015.11)

(56) References Cited

U.S. PATENT DOCUMENTS

| | | | |
|---|---|---|---|
| 7,327,000 B2 | 2/2008 | DeHeer et al. | |
| 7,824,651 B2 | 11/2010 | Zhamu et al. | |
| 8,263,843 B2 | 9/2012 | Kim et al. | |
| 9,067,796 B2 | 6/2015 | Strupinski | |
| 2007/0092716 A1* | 4/2007 | Guo | B82Y 30/00 428/323 |
| 2009/0057605 A1* | 3/2009 | Tokoro | G11B 5/712 252/62.55 |
| 2011/0168942 A1* | 7/2011 | Hitoe | C08J 5/10 252/74 |
| 2013/0139446 A1 | 6/2013 | Malik | |
| 2014/0197353 A1 | 7/2014 | Hong et al. | |
| 2015/0241147 A1* | 8/2015 | Brooks | F28F 21/02 165/185 |
| 2018/0072863 A1* | 3/2018 | Scheffer | C08K 3/042 |

FOREIGN PATENT DOCUMENTS

| WO | 2015184555 A1 | 12/2015 |
|---|---|---|
| WO | WO2015/184555 * | 12/2015 |

OTHER PUBLICATIONS

N Umehara ("Magnetic fluid grinding-a New technique for finishing advanced ceramics".Jan. 1994, cited in IDS). (Year: 1994).*
PCT/US17/14100 International Search Report and Written Opinion dated Apr. 17, 2017, 11 pages.
English language translation—CN 102225759 from Google Patents: https://encrypted.google.com/patents/CN102225759A?cl=en, 6 pages.
Fan et al., "Preparation and Electrical Properties of Graphene Nanosheet/Al2O3 Composites" Carbon (2010) vol. 48, pp. 1743-1749.
He et al., "Preparation and Consolidation of Alumina/Graphene Composite Powders" Materials Transactions (2009) vol. 50, No. 4, pp. 749-750.
Hu et al., "On the Nucleation of Graphene by Chemical Vapor Deposition" New Journal of Chemistry (2012) vol. 36, No. 1, pp. 73-77.
Hummers et al., "Preparation of Graphitic Oxide" Journal of the American Chemical Society (1958) p. 1339.
Hwang et al., "Enhanced Mechanical Properties of Graphene/Copper Nanocomposites Using a Molecular-Level Mixing Process" Advanced Materials (2013) vol. 25, pp. 6724-6729.
Jang et al., "Processing of Nano Graphene Platelets (NGPs) and NGP Nanocomposites: A Review" Journal of Materials Science (2008) vol. 43, pp. 5092-5101.
Li, "Conductive Enhancement of Copper/Graphene Composites Based on High-Quality Graphene" RSC Advance (2015) vol. 5, pp. 80428-80433.
Umehara et al., "Magnetic Fluid Grinding—A New Technique for Finishing Advanced Ceramics" CIRP Annals-Manufacturing Technology (1994) vol. 43, No. 1, pp. 187-188.
Wang et al., "Effect of the Content of Ball-Milled Expanded Graphite on the Bending and Tribological Properties of Copper-Graphite Composites" Materials and Design (2013) vol. 47, pp. 667-671.
Yang et al., "Two-dimensional Graphene Nanoribbons" Journal of the American Chemical Society (2008) vol. 130, pp. 4216-4217.
B. Z. Jang and A Zhamu, "Processing of Nano Graphene Platelets (NGPs) and NGP Nanocomposites: A Review," J. Materials Sci. 43 (2008) 5092-5101.
William S. Hummers, Jr., et al., Preparation of Graphitic Oxide, Journal of the American Chemical Society, 1958, p. 1339.
Yang, et al. "Two-dimensional Graphene Nano-ribbons," J. Am. Chem. Soc. 130 (2008) 4216-17.
Chen, Effect of the content of ball-milled expanded graphite on the bending and tribological properties of copper—graphite composites, Materials and Design May 2013; 47:667-671.
Jiang et al, Preparation and electrical properties of graphene nanosheet/ Al2O3 composites, Carbon 48 (2010) 1743-1749.
Pan, Conductive enhancement of copper/graphene composites based on high-quality graphene, RSC Advance, 2015, 5, 80428-80433.
Jeon et al, Enhanced Mechanical Properties of Graphene/Copper Nanocomposites Using a Molecular-Level mixing process. Advanced Materials 2013, 25, 6724-6729].
Tsuji et al, On the Nucleation of Graphene by Chemical Vapor Deposition, New Journal of Chemistry Jan. 2012; 36(1):73-77. DOI:10.1039/C1NJ20695H.

* cited by examiner

_____ 500 nm

____ scale = 500 nm

CHEMICAL-FREE PRODUCTION OF GRAPHENE-REINFORCED INORGANIC MATRIX COMPOSITES

FIELD OF THE INVENTION

The present invention relates to the art of graphene materials and, in particular, to an environmentally benign and cost-effective method of producing graphene-reinforced inorganic matrix composites.

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for chemical-free production of isolated nano graphene platelets that is novel in that is does not follow the established methods for production of nano graphene platelets outlined below. In addition, the process is of enhanced utility in that it is cost effective, and provided novel graphene materials with significantly reduced environmental impact. Four main prior-art approaches have been followed to produce NGPs. Their advantages and shortcomings are briefly summarized as follows:

Production of Isolated Graphene Sheets

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,200° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations outlined above.

Approach 2: Direct Formation of Pristine Nano Graphene Platelets

In 2002, our research team succeeded in isolating single layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications. The present invention was made to overcome the limitations outlined above.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2, 3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets. The present invention was made to overcome the limitations outlined above.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets. These graphene sheets are particularly effective in reinforcing inorganic matrix composite materials.

Applications and Importance of Graphene-Reinforced Inorganic Nanocomposites

Potential applications of graphene reinforced inorganic matrix composites (also hereinafter referred to as graphene-inorganic nanocomposites or simply graphene nanocomposites) take advantage of five major areas of property enhancement: electrical conductivity, thermal conductivity, mechanical property enhancement, grain boundary pinning, and barrier properties. Examples of specific applications include heat sinks, toughened ceramics, dental materials, artificial bones, electronic housings, EMI shielding, metal objects used in harsh environment, active materials for energy storage applications, active materials for photovoltaic energy production, thermoelectric materials, catalyst materials, photo catalysts, and conductive ceramics. Electrically conductive graphene inorganic nanocomposites also provide major opportunity's for deicing of aircraft body panels, automobiles, trains, windows, and solar modules.

In the instant specification, NGPs or graphene sheets can refer to pristine graphene, graphene oxide (GO), reduced graphene oxide (RGO), graphene fluoride, and chemically functionalized graphene.

Four main prior-art approaches have been followed to produce graphene/inorganic nanocomposites. They are outlined in FIG. 2, and briefly summarized as follows:

Method 1: Ball Milling of Graphene or Expanded Graphite with Inorganic Particles to Produce Nanocomposites In this prior art approach, graphene is pre-created as described above (production of isolated graphene sheets) or expanded graphite is produced by an intercalation and exfoliation process. In brief, graphitic material is first intercalated with acids to create a graphite intercalation compound (GIC). The GIC is washed and dried, then subjected to the second step of expansion. In this step, heat, microwave energy or plasma is used to expand the GIC via rapid expansion of the intercalant. This is a dramatic, exothermal process with a volume expansion of 50 to 300 times, accompanied by release of acid fumes as the intercalant escapes. The platelets created by this process are still attached at some edges, creating long particles with a thickness similar to that of the platelet width of the original GIC. These are sometimes referred to as "graphite worms" because of their appearance.

Chen et al [Chen, Effect of the content of ball-milled expanded graphite on the bending and tribological properties of copper-graphite composites, Materials and Design 05/2013; 47:667-671] teaches the addition of expanded graphite to copper powders, followed by ball milling to separate expanded graphite attachments and coat them onto metal powders, followed by a final sintering step. Jiang et al [Jiang et al, Preparation and electrical properties of graphene nanosheet/$Al_2O_3$ composites, Carbon 48 (2010) 1743-1749] teaches the use of graphene and alumina input into a ball mill to create a graphene/alumina nanocomposite with electrical conductivity increased by 2-3 orders of magnitude. This process is illustrated in FIG. 3. [Pan, Conductive enhancement of copper/graphene composites based on high-quality graphene, RSC Advance, 2015, 5, 80428-80433]

In a similar process, Malik [A-S Malik, Sintered Boron Nitride Cutting Tool, US 2013/0139446] used an attritor mill with isopropanol to mix and size reduce a slurry of boron nitride particles and nano graphene platelets. Subsequent to mixing, the slurry was oven dried, screened at 40 mesh to break up agglomerates, and made into compacts by powder pressing. The material was sintered at 65 kbar and 1500° C. to create a densified nanocomposite. The sintered compacts were then ground to create cutting tools.

The use of graphene or expanded/exfoliated graphite (made by thermally exfoliating GIC) as an input material for a ball mill process to create graphene composites has several significant disadvantages:

1. Requirement for size reduction of graphitic precursor material. For the intercalation process to be successful, size of the starting material needs to be less than about 200 microns. In a typical industrial process, material is reduced to a platelet diameter of 75 microns or less. Size reduction is an energy intensive process and has a risk of explosion due to high concentrations of combustible powders.
2. Damage to graphene structure from chemical intensive process. The acid intercalation process creates atomic level damage to the ordered graphitic structure. This damage can be readily detected via Raman spectroscopy of graphitic material processed by GIC. These materials have lower electrical and thermal conductivity compared to "pristine" graphitic material that has never been intercalated.
3. Chemical residues. After exfoliation, the graphene or expanded graphite may have 2-3% sulfur by weight. Removal of this residue requires use of significant amounts of water or solvents, which the need to be removed. The removal process may create agglomerates, reducing the opportunity to create a uniform dispersion of graphene.
4. Graphene as an input material to this process is comparatively costly.
5. With a liquid carrier in a ball mill, a drying step is required. The oven drying process can cause nano-scale agglomeration of graphene particles. This material cannot be de-agglomerated by a 40 mesh screen, yet use of an appropriate mesh size (625 mesh or higher) is not possible due to coated particles clogging the mesh.
6. Use of a solvent carrier on an industrial scale necessitates solvent recovery equipment, which will increase energy usage and production costs.

Method 2: Infiltration of Metal into Graphene Sheets

Kim et al [U.S. Pat. No. 8,263,843, Graphene Nanoplatelet Metal Matrix] teaches a process of forming a porous graphene film on a sacrificial material, removing that material by heat or chemicals, and infiltrating the porous material with metal by electrolytic plating, electroless plating, evaporation or sputtering. This process can be repeated layer by layer to create a solid material of the desired shape. This process has several disadvantages:

1. The creation of a metal matrix by plating is a costly, chemical intensive, time intensive process.
2. The creation of a porous graphene film on a metal mesh or sacrificial material does not create mechanically strong attachments between adjacent platelets. The porous film is likely to be displaced and any intentional planar platelet orientation reduced during the matrix infiltration process. Because of displacement, this process does not create a continuous interconnected network of graphene sheets.
3. Air pockets or pockets of plating solution are likely to be formed during the infiltration process. This process does not have a clearly defined method to remove these.
4. This process is limited to matrix materials that can be plated, evaporated, or sputtered. Glass and ceramic materials will present significant challenges.

Method 3: Molecular Level Mixing Process

Jeon et al [Jeon et al, Enhanced Mechanical Properties of Graphene/Copper Nanocomposites Using a Molecular-Level mixing process. Advanced Materials 2013, 25, 6724-6729] teaches a method of functionalizing graphene oxide with copper acetate, followed by addition of NaOH to reduce copper ions to CuO, forming copper/graphene nanopowders. These were reduced at 400° C. for 3 hours under hydrogen atmosphere, followed by spark plasma sintering at 50 MPA, 600° C., to form test samples. A similar molecular level mixing process is taught by Hong et al [US 2014/0197353 Graphene/ceramic nanocomposite powder and a production method thereof.] In one example, graphene oxide is combined with aluminum nitrate hydrate, followed by solvent removal. The material is calcined at 350° C. for 5 hours in an inert atmosphere, creating a graphene/alumina nanocomposite powder. The powder was made into a finished article by spark plasma sintering.

This method has several challenges and limitations for industrial production:

1. This method of creating the nanocomposites is indirect. Graphite is oxidized in a chemical intensive process, reacted with a metalorganic compound, and then converted back into a pure carbon. The metal is converted to a metalorganic, reacted, and then converted back to a pure metal. This is a chemical intensive, energy intensive process that will be very costly for scale up.
2. Many metalorganic compounds have significant health, safety and environmental risks compared to pure metal, glass or ceramic materials.
3. The use of the modified Hummer's method damages the crystalline structure of graphite, as demonstrated by widely published Raman spectroscopy data. This damage is well understood to adversely impact electrical conductivity, thermal conductivity, and barrier properties.
4. Calcination temperatures required to convert metal oxides into reduced matrix material are sufficiently high to allow diffusion of carbon from graphene oxide or graphene platelets into the matrix material. This can adversely impact desired electrical, thermal and mechanical properties.
5. Control of stoichiometry presents significant difficulties. Production of a graphene/copper composite is feasible, however production of a graphene/barium titanate composite may not be.

Method 4: CVD Graphene onto Metal Particles

Strupinski [U.S. Pat. No. 9,067,796 B2, Method of manufacturing microscopic graphene-containing grains and material obtainable thereby] teaches a CVD process to grow graphene onto metal particles. In one example, graphene is grown onto copper grains at 600 to 1040° C. This method has some significant disadvantages:

1. Composite matrix materials are limited to those that are successful templates for graphene growth by CVD: Cu, Ni, Ru, Ir, Co, Pt, Pd and W. This process cannot be used with glass or ceramic particles.

2. Successful production of graphene (versus amorphous carbon) is dependent on crystallographic orientation of the template particle for some CVD processes. For example, graphene is produced with a crystallographic orientation of (111) on copper versus amorphous carbon with a crystallographic orientation of (100) or (110). With (100) and (110) orientation, overcoming the production of amorphous carbon requires additional input gases and higher process temperatures. [Tsuji et al, On the Nucleation of Graphene by Chemical Vapor Deposition, New Journal of Chemistry 01/2012; 36(1): 73-77. DOI:10.1039/C1NJ20695H]
3. The process is energy intensive, gas intensive and requires costly plasma generation equipment.
4. Due to the high process temperatures, some of the carbon added to the process will diffuse into the bulk of the metal particles; this has deleterious effects in many inorganic materials, especially in Aluminum, creating brittle Al carbide inclusions. These inclusions adversely impact further processing. Carbon doping can adversely impact desired electrical, thermal and mechanical properties.
5. Propane is an expensive carbon source compared to graphite.

The present invention was made to overcome the limitations of prior art processes outlined above.

SUMMARY OF THE INVENTION

The present invention provides a strikingly simple, fast, scalable, environmentally benign, and cost-effective method of producing graphene-reinforced inorganic matrix composites. This method meets the aforementioned needs. This method entails producing single-layer or few layer graphene sheets directly from a graphitic or carbonaceous material (a graphene source material) and immediately transferring these graphene sheets onto surfaces of inorganic particles (herein referred to as solid carrier material particles) to form graphene-coated or graphene-embedded solid inorganic particles. (The graphitic material or carbonaceous material has never been intercalated, oxidized, or exfoliated and does not include previously produced isolated graphene sheets.) The graphene-coated inorganic particles are then consolidated into a composite material of a desired shape via, for instance, sintering, melting, hot isostatic pressing, or other methods commonly known in the art of powder metallurgy or ceramic processing.

One embodiment of the instant invention is a method of producing a graphene-reinforced inorganic matrix composite directly from a graphitic material, comprising: a) mixing multiple particles of a graphitic material and multiple particles of a solid inorganic material to form a mixture in an impacting chamber of an energy impacting apparatus, wherein the graphitic material has never been intercalated, oxidized, or exfoliated and does not include previously produced isolated graphene sheets; b) operating the energy impacting apparatus with a frequency and an intensity for a length of time sufficient for transferring graphene sheets from the graphitic material to surfaces of the solid inorganic material particles to produce graphene-coated inorganic particles and possibly a residue of said graphitic material (if not fully utilized) inside the impacting chamber; c) separating the graphene-coated inorganic particles from the graphitic material residue (if existing); and d) forming the graphene-coated inorganic particles into the graphene-reinforced inorganic matrix composite.

The mass of graphene-coated or graphene-embedded solid inorganic particles can be sold as a separate product. In these graphene-coated or graphene-embedded particles, the graphene proportion is typically from 0.01% to 80% by weight based on the total weight of graphene and inorganic combined. This product can also create an inorganic composite masterbatch in which fillers are dispersed in an inorganic matrix and the mixture is made into a pellet form. The masterbatch can be mixed with inorganic materials at any practical proportion to form a blend and then sintered, hot pressed, or cast, for instance. It may be noted that it has been difficult to disperse more than 25% of graphene in an inorganic matrix by using the conventional approaches.

The inorganic particles may be selected from metals, ceramic, glasses, or a combination thereof. Some examples of elements that may be included are iron, copper, aluminum, lead, tin, zinc, indium, iridium, vanadium, manganese, nickel, zirconia, technetium, tungsten, silver, beryllium, cadmium, gold, platinum, palladium, niobium, molybdenum, chromium, manganese, cobalt, aluminum, zirconia, titanium and boron.

In a preferred embodiment, this method comprises subjecting a mixture of graphitic material, particles of an inorganic solid carrier material, and, optionally, impacting balls to mechanical agitation via a ball mill or a similar energy impacting device for a length of time sufficient for peeling off graphene layers (planes of hexagonally arranged carbon atoms) from the source graphite material, and coating these peeled-off graphene layers onto surfaces of the solid inorganic carrier material particles. With the presence of impacting balls, graphene sheets can be peeled off from the source graphite particles and tentatively deposited onto the surfaces of impacting balls. When these graphene sheet-coated impacting balls subsequently impinge upon solid carrier particles, the graphene sheets are transferred to surfaces of carrier particles to produce graphene-coated inorganic particles. In some embodiments, graphene sheets may be embedded into the carrier particles. Subsequently, the graphene-coated inorganic particles are formed into a graphene-reinforced inorganic matrix composite.

In certain embodiments, a plurality of impacting balls or media are added to the impacting chamber of the energy impacting apparatus if the solid inorganic carriers are not sufficiently dense, hard and rigid. In a preferred embodiment, a magnet is used to separate the impacting balls or media from the graphene-coated inorganic particles prior to step of forming the graphene-coated inorganic particles into the graphene-reinforced inorganic matrix composite.

Preferably, the starting material (graphitic or carbonaceous material as a graphene source material) has never been previously intercalated or chemically oxidized. This starting material is not a graphite intercalation compound (GIC) or graphite oxide (GO). Preferably, the source graphitic material is selected from natural graphite, synthetic graphite, highly oriented pyrolytic graphite, meso-carbon micro-bead, graphite fiber, graphitic nano-fiber, graphite oxide, graphite fluoride, chemically modified graphite, exfoliated graphite, vein graphite, semi-crystalline graphite, disordered carbon, or a combination thereof.

In some embodiments, the impacting chamber of the energy impacting apparatus further contains a protective fluid; e.g. inert gas, non-reactive liquid, water, etc.

This process is of low cost and highly scalable. In less than 2 hours of process time (less than 20 minutes in many cases), graphene sheets are peeled off from graphite particles and re-deposited onto surfaces of inorganic particles. The resulting graphene-coated inorganic particles can be hot pressed or sintered, directly producing graphene-reinforced inorganic composite parts. In a period of 20 minutes-2 hours one could produce graphene-inorganic nanocomposite components directly from a source graphite material. This process is stunningly fast and simple, considering the notion that the production of graphene sheets from graphite by using most of the known processes would take 4-120 hours just for intercalation and oxidation, plus times for repeated rinsing and drying, and subsequent thermal exfoliation. Furthermore, the dispersion of graphene sheets in an inorganic matrix is also known to be a highly challenging task. The present invention combines the graphene production, graphene-inorganic mixing (graphene dispersion), and composite processing into a single operation.

A preferred embodiment of the present invention is a method of directly mixing a graphitic material and a carrier material into an energy impacting device, such as a ball mill, and submitting the mixture to a sufficiently long treatment time to peel off graphene layers from the source graphitic material and transfer these graphene layers immediately to the carrier material surfaces. These graphene sheets are typically single-layer or few-layer graphene sheets (typically <5 layers; mostly single-layer graphene). Following this step, the graphene-coated inorganic particles are formed into a composite shape using a broad array of powder metallurgy and ceramic processing techniques.

For instance, this step of composite forming can include sintering or microwave sintering the inorganic particles in an inert or reducing atmosphere to form a mixture of inorganic melt and graphene sheets dispersed therein, or forming the inorganic melt-graphene mixture into a desired shape and densifying using hot pressing or hot isostatic pressing. In certain embodiments, the process includes melting the inorganic particles to form an inorganic melt mixture with graphene sheets dispersed therein and subsequently extruding the mixture into a rod form or sheet form, solidifying the mixture into a fiber form, spraying the mixture into a powder form via rapid solidification, or casting the mixture into an ingot form. Another preferred embodiment is spark plasma sintering to create a desired shape.

In an embodiment, the composite forming step includes sintering the graphene-coated inorganic particles into a desired shape of the graphene-reinforced inorganic matrix composite.

It may be noted that the graphene production step per se (peeling off graphene sheets directly from graphite particles and immediate or concurrent transfer of graphene sheets to inorganic particle surfaces) is quite surprising, considering the fact that prior researchers and manufacturers have focused on more complex, time intensive and costly methods to create graphene in industrial quantities. In other words, it has been believed that chemical intercalation and oxidation is needed to produce bulk quantities of graphene platelets. The present invention defies this expectation in many ways:

1. Unlike the chemical intercalation and oxidation (which requires expansion of inter-graphene spaces, further expansion or exfoliation of graphene planes, and full separation of exfoliated graphene sheets), the instant method directly removes graphene sheets from a source graphitic material and transfers these graphene sheets to surfaces of carrier material particles. No undesirable chemicals (e.g. sulfuric acid and nitric acid) are used.
2. Unlike oxidation and intercalation, pristine graphene sheets can be transferred onto the carrier material. The sheets being free of oxidation damage allow the creation of graphene containing products with higher electrical and thermal conductivity.
3. Contrary to common production methods, a washing process requiring substantial amounts of water or solvent is not needed
4. Unlike bottom up production methods or CVD production methods, large platelets can be produced with the instant method.
5. Unlike CVD and solution-based metalorganic production methods, elevated temperatures are not required to reduce graphene oxide to graphene and metalorganic compounds to pure metal. This greatly reduces the opportunity for undesirable diffusion of carbon into the matrix material.
6. Unlike CVD and solution-based metalorganic production methods, this process is amenable to almost any solid inorganic matrix material. The matrix material does not need to be a compatible "template" or catalyst, as is required for the CVD process.
7. Unlike solution-based metalorganic production methods, the majority of the graphene sheets are on the outside of the particle. This allows the creation of continuous, interpenetrating three dimensional networks of graphene sheets and of matrix material.
8. Unlike the layer infiltration process, the present invention is amenable to industrial scale production in a continuous energy impact device.
9. Unlike prior art processes, graphene coated carrier particles can be created without size reduction of the input graphitic material. The only limitation on the size of input material is the size of the impact chamber of the energy impact device.

Carrier materials can be in the form of inorganic powder, flakes, pellets, filament, fibers, or other forms.

The energy impacting apparatus may be selected from a ball mill, vibratory ball mill, planetary ball mill, high energy mill, basket mill, agitator ball mill, continuous ball mill, stirred ball mill, pressurized ball mill, plasma assisted ball mill, vacuum ball mill, freezer (SPEX) mill, vibratory sieve, ultrasonic homogenizer mill, resonant acoustic mixer, or shaker table.

The presently invented process is capable of producing and dispersing single-layer graphene sheets. In many examples, the graphene material produced contains at least 80% single-layer graphene sheets. The graphene produced can contain pristine graphene, oxidized graphene with less than 5% oxygen content by weight, graphene fluoride with less than 5% fluorine by weight, graphene with a carbon content no less than 95% by weight, or functionalized graphene.

In certain embodiments, the impacting chamber further contains a modifier filler selected from a carbon fiber, ceramic fiber, glass fiber, carbon nanotube, carbon nanofiber, metal nano wire, metal particle, ceramic particle, glass powder, carbon particle, graphite particle, organic particle, or a combination thereof. The modifier filler can improve chemical, mechanical, and physical (electric, thermal, optical, and/or magnetic) properties of the resulting composites. For instance, the modifier filler can be ferromagnetic or paramagnetic.

Another surprising and highly advantageous feature of the presently invented process is the notion that graphene sheet production and chemical functionalization can be accomplished concurrently in the same impacting chamber. The impact-induced kinetic energy experienced by the carrier particles are of sufficient energy and intensity to chemically activate the edges and surfaces of graphene sheets coated on carrier particle surfaces; e.g. creating highly active sites or free radicals). Desired functional groups can be imparted to graphene edges and/or surfaces, provided that selected chemical species (functionalizing agents) containing desired chemical function groups (e.g. —$NH_2$, Br—, etc.) are dispersed in the impacting chamber. Chemical functionalization reactions can occur in situ as soon as the reactive sites or active radicals are formed. Different functional groups are desired in different inorganic matrix materials for the purpose of enhancing interfacial bonding between graphene sheets and an inorganic matrix, modifying surface wettability, or for adding dopants to the inorganic matrix.

Thus, in some embodiments, step (b) of operating the energy impacting apparatus acts to chemically functionalize the produced graphene sheets with the functionalizing agent in the same impacting apparatus. Functionalization of graphene is aimed at creating a favorable chemical condition for the inorganic matrix (e.g. metal melt) to properly wet the graphene sheets and/or creating desirable inter-phases between graphene sheets and the inorganic matrix material for certain improved properties.

In some embodiments, functionalizing agents contain a chemical functional group selected from functional group is selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

Alternatively, the functionalizing agent contains an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

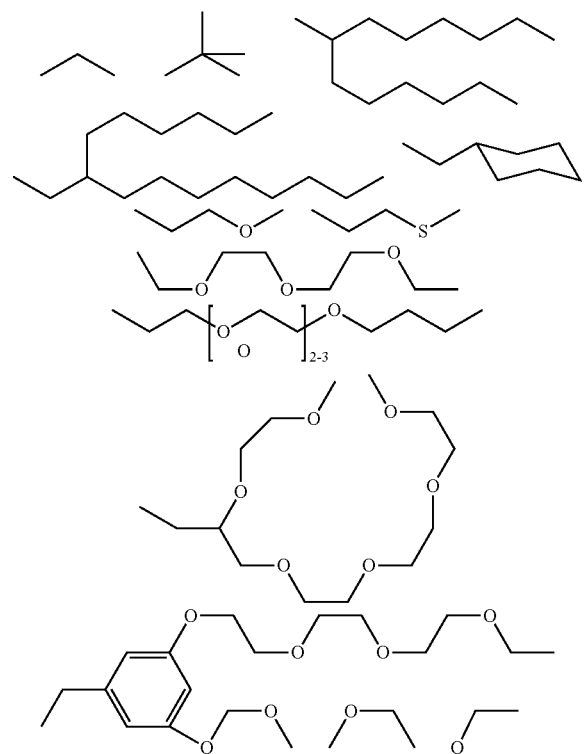

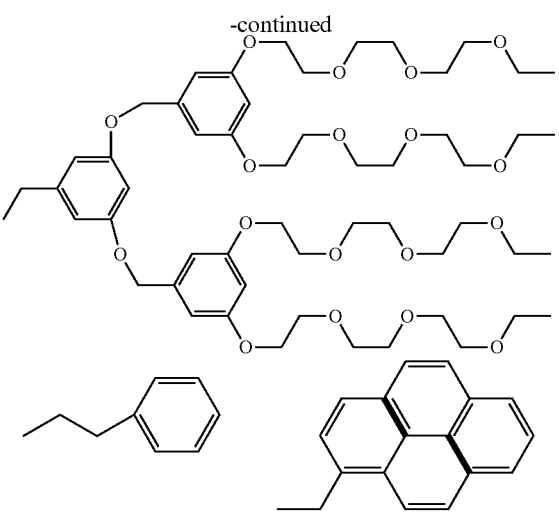

and combinations thereof.

In certain embodiments, the functionalizing agent contains an oxygenated group selected from the group consisting of hydroxyl, peroxide, ether, keto, and aldehyde. In certain embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, Si(—OR'—)$_y$R'$_{3-y}$, Si(—O—$SiR'_2$—)OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

The functionalizing agent may contain a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof. These functionalizing agents may improve the inorganic composite's compatibility with future organic-based coating materials.

In some embodiments, the functionalizing agent contains a functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'$N^+(R')_3X^-$, $R'SiR'_3$, R'Si(—OR'—)$_y$R'$_{3-y}$, R'Si(—O—$SiR'_2$—)OR', R'—R", R'—N—CO, ($C_2H_4O$—)$_w$H, (—$C_3H_6O$—)$_w$H, (—$C_2H_4O$)$_w$—R', ($C_3H_6O$)$_w$—R', R', and w is an integer greater than one and less than 200.

The procedure of operating the energy impacting apparatus may be conducted in a continuous manner using a continuous energy impacting device. This process can be automated.

The present invention also provides a mass of graphene-coated or graphene-embedded inorganic particles produced by the method without carrying out or prior to forming the graphene-coated or graphene-embedded particles into a composite part. In this mass, graphene proportion is from 0.01% to 80% by weight (more typically from 0.1% to 70% and further more typically from 1% to 60%) based on the total weight of graphene and inorganic combined. The mass of graphene-coated or graphene-embedded inorganic particles can be fed into a press, a sintering furnace, or a selective laser sintering apparatus to make a graphene-reinforced inorganic composite part.

The present invention also provides a mass of graphene-coated or graphene-embedded inorganic particles produced by the method without carrying out or prior to forming the graphene-coated or graphene-embedded particles into a composite part. This mass of particles can be pressed into a solid composite material at room temperature or at a temperature above or below the melting temperature of the bulk inorganic material. This mass can also be consolidated by ultrasonic welding, selective laser sintering, microwave heating, etc.

DETAILED DESCRIPTION OF PREFERRED EMBODIMENTS

Figure 1:
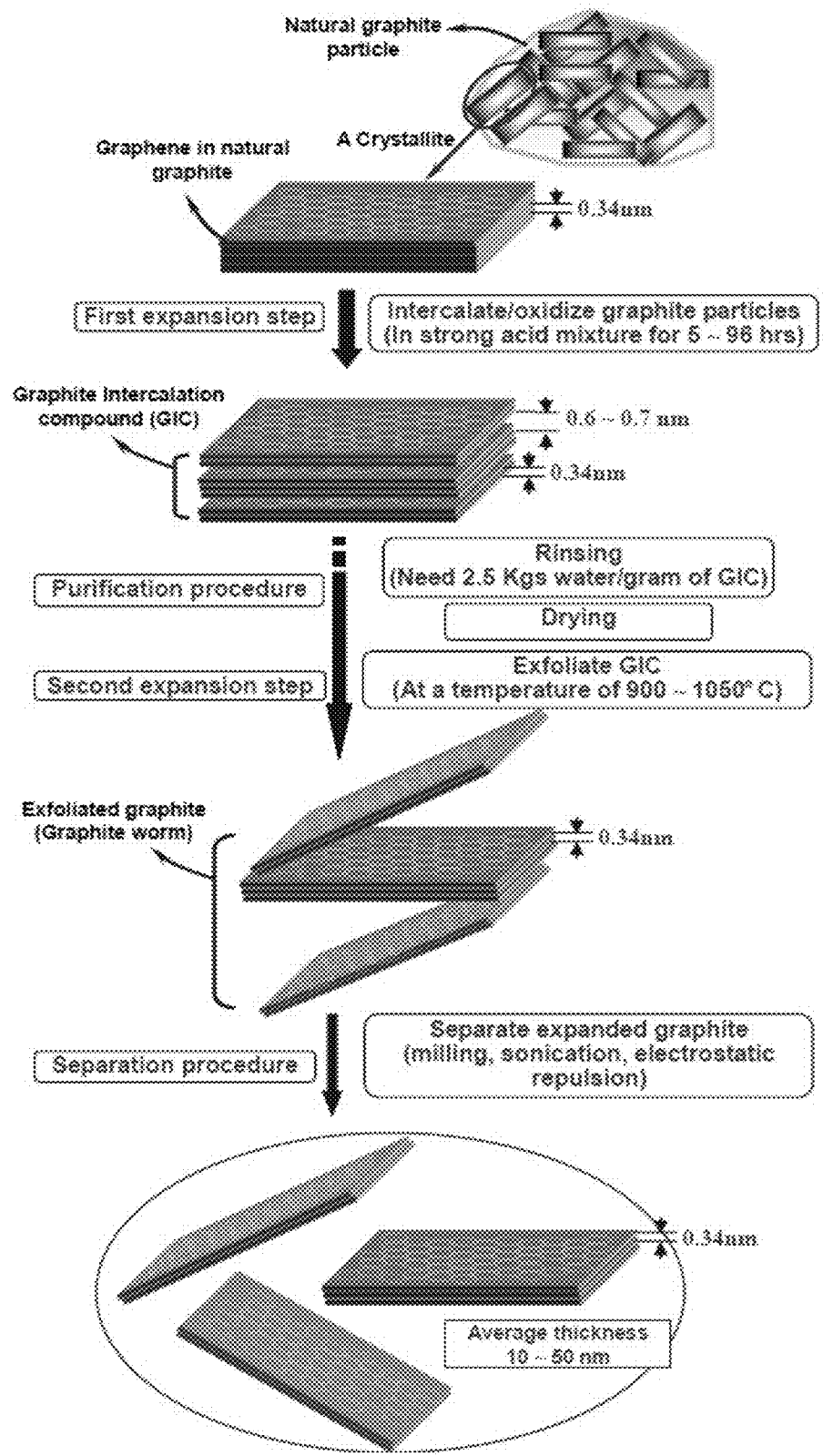
FIG. 1 A flow chart showing the most commonly used prior art process of producing highly oxidized graphene sheets (NGPs) that entails tedious chemical oxidation/intercalation, rinsing, and high-temperature exfoliation procedures.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber.

One preferred specific embodiment of the present invention is a method of producing a nano graphene platelet (NGP) material and its inorganic matrix composite. An NGP is essentially composed of a sheet of graphene plane (hexagonal lattice of carbon atoms) or multiple sheets of graphene plane stacked and bonded together (typically, on an average, less than five sheets per multi-layer platelet). Each graphene plane, also referred to as a graphene sheet or basal plane comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene with some few-layer graphene sheets (<5 layers). The length and width of a NGP are typically between 200 nm and 20 μm, but could be longer or shorter, depending upon the sizes of source graphite material particles.

The solid inorganic material may be selected from iron, copper, aluminum, lead, tin, zinc, indium, iridium, vanadium, manganese, nickel, zirconia, technetium, silver, silicon, cadmium, gold, platinum, niobium, molybdenum, chromium, manganese, cobalt, alumina, zirconia, titanium dioxide, boron nitride, soda lime glass, lead containing glass, aluminosilicate containing glass, tellurite-containing glass, antimony-containing glass, arsenate-containing glass, titanate-containing glass, tantalite-containing glass, borosilicate-based glasses, silica, high silica content glass, amorphous silicon dioxide, quartz, fused quartz, alumina, beryllia, ceria, carbide, boride, nitride, silicide, carborundum, diamond, an alloy thereof, or a combination thereof.

The solid inorganic material may also be selected from zirconium barium titanate, strontium titanate (ST), calcium titanate (CT), magnesium titanate (MT), calcium magnesium titanate (CMT), zinc titanate (ZT), lanthanum titanate (TLT), and neodymium titanate (TNT), barium zirconate (BZ), calcium zirconate (CZ), lead magnesium niobate (PMN), lead zinc niobate (PZN), lithium niobate (LN), barium stannate (BS), calcium stannate (CS), magnesium aluminium silicate, magnesium silicate, barium tantalate, titanium dioxide, niobium oxide, zirconia, silica, sapphire, beryllium oxide, and zirconium tin titanate, indium tin oxide (ITO), lanthanum-doped strontium titanate (SLT), yttrium-doped strontium titanate (SYT) Yttria-stabilized zirconia (YSZ), gadolinium-doped ceria (GDC), lanthanum strontium gallate magnesite (LSGM), beta alumina, lead zirconate titanate (PZT). Barium titanate (BT), strontium titanate (ST), quartz, ferrites, strontium carbonate, lanthanum strontium manganite, and combinations thereof.

Figure 4:
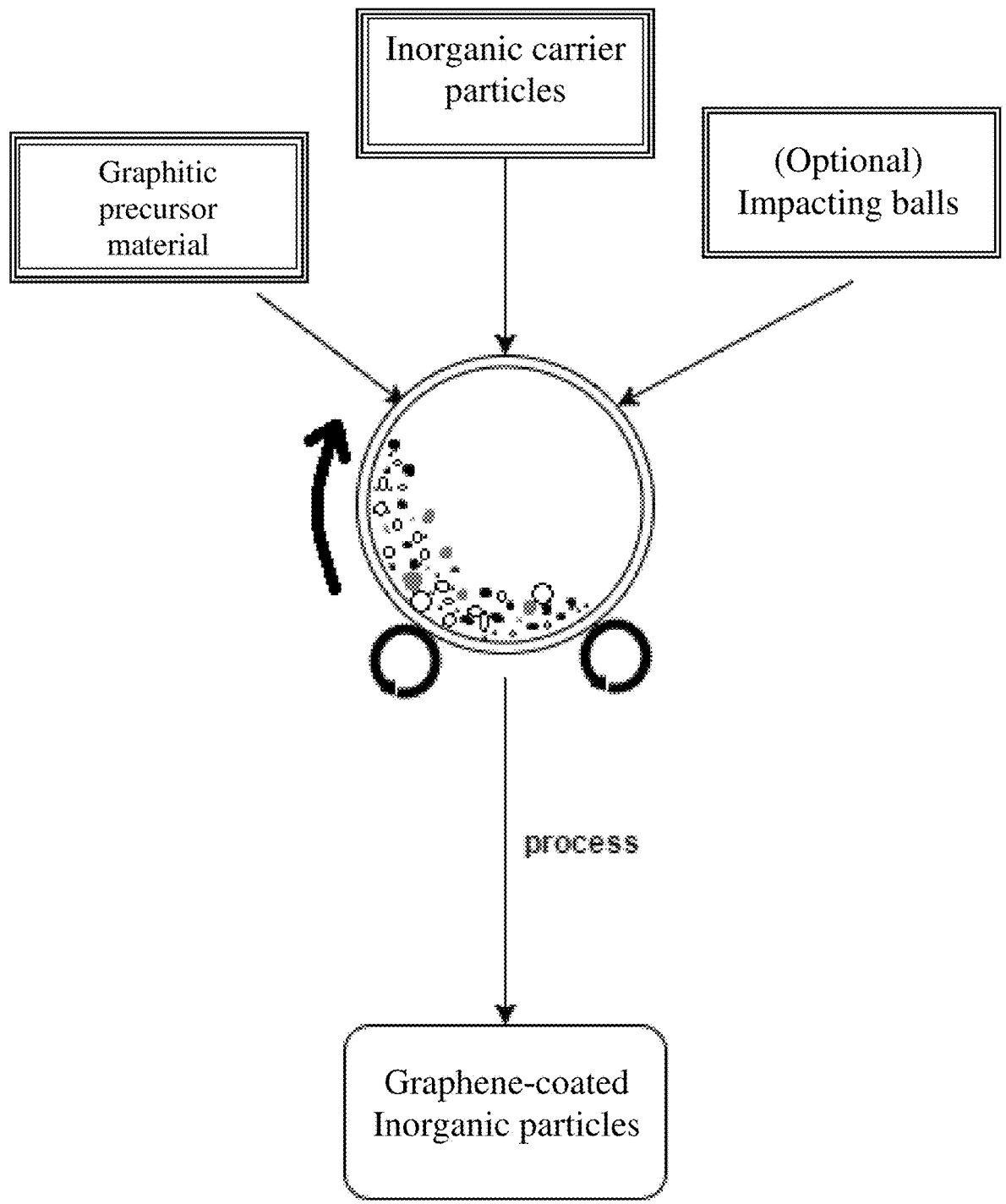
FIG. 4 A diagram showing the presently invented process for producing graphene-reinforced inorganic matrix composites via an energy impacting apparatus.

The present invention provides a strikingly simple, fast, scalable, environmentally benign, and cost-effective process that avoids essentially all of the drawbacks associated with prior art processes of producing graphene sheets, which are quickly transferred to particles of a desired inorganic intended to become a matrix of a composite. As schematically illustrated in FIG. 4, one preferred embodiment of this method entails placing source graphitic material particles and particles of a solid inorganic carrier material (plus optional impacting balls, if so desired) in an impacting chamber. After loading, the resulting mixture is immediately exposed to impacting energy, winch is accomplished, for instance, by rotating the chamber to enable the impacting of the carrier particles (and optional impacting balls) against graphite particles. These repeated impacting events (occurring in high frequencies and high intensity) act to peel off graphene sheets from the surfaces of graphitic material particles and directly transfer these graphene sheets to the surfaces of inorganic carrier particles (if no impacting balls are present) to form graphene-coated inorganic particles.

Some of the graphene platelets may become embedded into the inorganic particles. This is a "direct transfer" process.

Alternatively, in the impacting chambers containing impacting balls (e.g. stainless steel or zirconia beads), graphene sheets are also peeled off by the impacting balls and tentatively transferred to the surfaces of impacting balls first. When the graphene-coated impacting balls impinge upon the inorganic carrier material particles, the graphene sheets are transferred to surfaces of the inorganic carrier material particles to form graphene-coated inorganic particles.

This is an "indirect transfer" process.

In less than two hours (often less than 1 hour), most of the constituent graphene sheets of source graphite particles are peeled off, forming mostly single-layer graphene and few-layer graphene (mostly less than 5 layers or 5 graphene planes). Following the direct or indirect transfer process (coating of graphene sheets on carrier material particles), the impacting balls (if present) or residual graphite particles (if present) are separated from the graphene-coated inorganic particles using a broad array of methods. Separation or classification of graphene-coated inorganic particles from impacting balls and residual graphite particles (if any) can be readily accomplished based on their differences in weight or density, particle sizes, magnetic properties, etc. The resulting graphene-coated inorganic particles are already a "composite" or two-component material already; i.e. they are already "mixed". The two-component material is then thermally or mechanically processed into a shape of composite material.

In other words, production of graphene sheets and mixing of graphene sheets with an inorganic matrix material are essentially accomplished concurrently in one operation. This is in stark contrast to the traditional processes of producing graphene sheets first and then subsequently mixing the graphene sheets with an inorganic matrix material. Traditional dry mixing typically does not result in homogeneous mixing or dispersion of two or multiple components.

In this conventional process, as shown in FIG. 1, the prior art chemical processes for producing graphene sheets or platelets alone typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets, as herein prepared) exhibit electrical conductivity values in the range of 1,500-4,500 S/cm. In contrast, the RGO paper prepared by the same paper-making procedure typically exhibits electrical conductivity values in the range of 100-1,000 S/cm.

Figure 2:
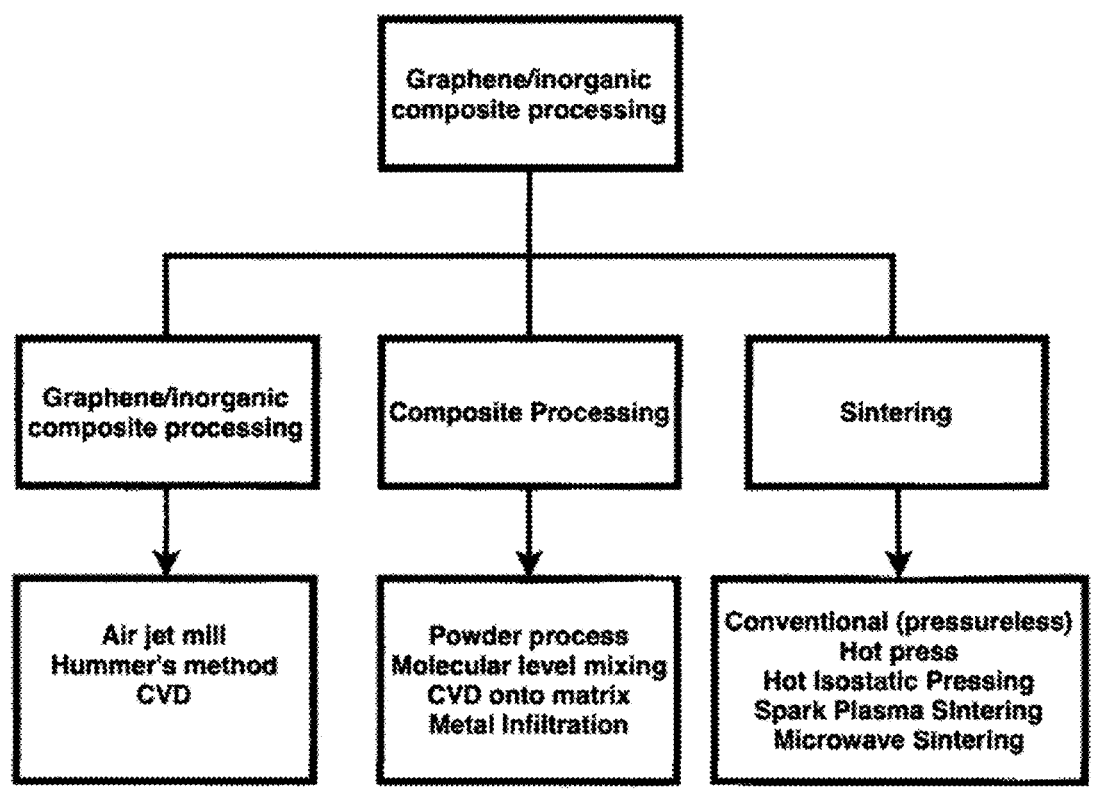
FIG. 2 A flow chart showing prior art processes for producing and densifying graphene-reinforced ceramic matrix composites.
Figure 3:
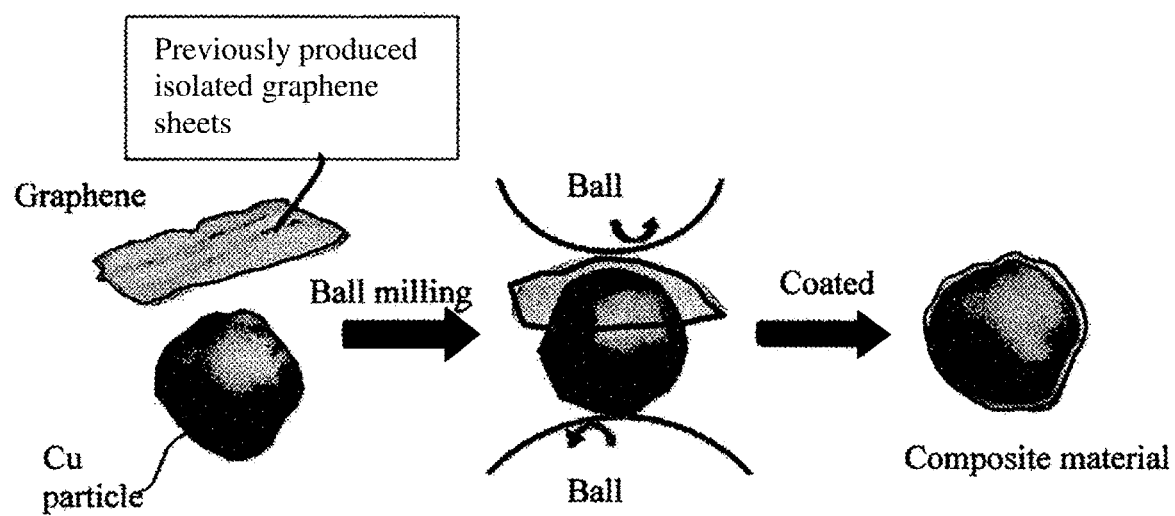
FIG. 3 Illustration of prior art ball mill process to produce inorganic/graphene composites from previously produced graphene sheets. [Source: Pan, et al., Conductive enhancement of copper/graphene composites based on high-quality graphene, RSC Advance, 2015, 5, 80428-80433]

In the conventional process of producing graphene-reinforced inorganic matrix composite, graphene sheets previously mixed with an inorganic matrix to form into a composite according to one of several approaches discussed earlier in the Background section: (1) ball mill mixing; (2) metal infiltration into graphene film; or (3) molecular mixing. Alternately, a CVD process can be used to coat inorganic particles. These methods are summarized in FIG. 2.

In the most common implementation of ball mill mixing, previously produced graphene sheets or platelets are added to inorganic powders. Energy is applied via ball mill for a short period of time to disperse graphene platelets or sheets in the inorganic powder. This is often carried out in a liquid (solvent) solution. The disadvantages of this graphene/inorganic mixing process are obvious—graphene is a costly input material, solvent recovery is required, and most significantly, the graphene input into the process has been damaged by oxidation during prior processing. This reduces desirable end properties such as thermal conductivity and electrical conductivity.

Another commonly used prior art process is metal infiltration into a graphene film. A porous graphene film is created on a metal mesh or fugitive mesh. Subsequently, metal is coated onto the graphene sheets and infiltrated into graphene film via plating, sputtering or evaporation.

There are some significant challenges to industrial scale up of the metal infiltration process. First, this is not a continuous process. The composite is created one layer at a time, with limitations to both planar size and thickness. Next, the graphene film process does not create covalent bonds between touching or adjacent graphene sheets. Wetting of the graphene film (for plating) or applying vacuum (for sputtering) will disarrange the fragile graphene film. Particle packing issues may create voids or even pockets of electrolyte. The result of this complex, costly process is not the desired three dimensional networks of mutually interpenetrating matrix and reinforcement, but rather an aluminum matrix containing aluminum-wrapped graphene.

In the commonly used prior art process of molecular level mixing, graphene oxide and a metalorganic compound are mixed, and the metalorganic is chemically bonded to the graphene oxide. The material is subsequently dried and processed.

This process has very limited opportunities for industrial use due to costly input materials, and comparatively limited options for matrix material due to limitations of available organometallic precursors. The graphene oxide input into the process has been damaged by oxidation during prior processing—this reduces desirable properties such as thermal conductivity and electrical conductivity. Additionally, thermal processing required to reduce graphene oxide to graphene and reduce the metalorganic to pure metal will allow diffusion of carbon into the matrix material. Carbon diffusion into the matrix may be undesirable, especially for aluminum alloys.

Another prior art process is coating of CVD onto metal nano particles. This is the most limited of all the prior art methods, being possible only on certain metals that are suitable templates for graphene grown. As a "bottom up" graphene production method, it requires costly capital equipment and costly input materials.

In all these prior art processes for producing graphene-reinforced inorganic matrix composite, composite particles are formed then the resulting mixture is made into a composite shape via sintering, pressing, melting, or other process.

In contrast, the presently invented impacting process entails combining graphene production, functionalization (if desired), and graphene-inorganic mixing in a single operation. This fast and environmentally benign process not only avoids significant chemical usage, but also produces a higher quality reinforcement material—pristine graphene as opposed to thermally reduced graphene oxide, as produced by the prior art process. Pristine graphene enables the creation of composite materials with higher electrical and thermal conductivity.

Although the mechanisms remain incompletely understood, this revolutionary process of the present invention appears to essentially eliminate the required functions of graphene plane expansion, intercalant penetration, exfoliation, and separation of graphene sheets and replace it with an entirely mechanical exfoliation process. The whole process can take less than 4 hours (typically 10 minutes to 2 hours), and can be done with no added chemicals. This is absolutely stunning, a shocking surprise to even those top scientists and engineers or those of extraordinary ability in the art.

Another surprising result of the present study is the observation that a wide variety of carbonaceous and graphitic materials can be directly processed without any particle size reduction or pre-treatment. This material may be selected from natural graphite, synthetic graphite, highly oriented pyrolytic graphite, meso-carbon micro-bead, graphite fiber, graphitic nano-fiber, graphite oxide, graphite fluoride, chemically modified graphite, exfoliated graphite, or a combination thereof. By contrast, graphitic material for used for the prior art chemical production and reduction of graphene oxide requires size reduction to 75 um or less average particle size. This process requires size reduction equipment (for example hammer mills or screening mills), energy input, and dust mitigation. By contrast, the energy impacting device method can accept almost any size of graphitic material. Starting material of several mm or cm in size or larger has been successfully processed to create graphene-coated or graphene-embedded inorganic particles. The only size limitation is the chamber capacity of the energy impacting device; but this chamber can be very large (industry-scaled).

The presently invented process is capable of producing single-layer graphene sheets well-dispersed in an inorganic matrix. In many examples, the graphene material produced contains at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content of no less than 95% by weight, or functionalized graphene.

The presently invented process does not involve the production of GIC and, hence, does not require the exfoliation of GIC at a high exfoliation temperature (e.g. 800-1, 100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_x$ and $SO_x$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present invention.

One preferred embodiment of the present invention is the inclusion of impacting balls or media to the impacting chamber, as illustrated in FIG. 4. The impact media may contain balls of metal, glass, ceramic, or organic materials. The size of the impacting media may be in the range of 1 mm to 20 mm, or it may be larger or smaller. The shape of the impacting media may be spherical, needle like, cylindrical, conical, pyramidal, rectilinear, or other shapes. A combination of shapes and sizes may be selected. The size distribution may be unimodal Gaussian, bimodal or tri-modal.

Another preferred embodiment of this method is melt compounding of the graphene-coated or graphene-embedded particles to create graphene/inorganic nanocomposites. The melted inorganic-graphene (graphene sheets dispersed in a inorganic matrix) can be extruded to create nanocomposite inorganic pellets, sheets, rods, or fibers. The melted inorganic may also be directly formed into a desired shape and solidified into a graphene-reinforced inorganic matrix nanocomposite.

Another embodiment of this invention is melting the coated inorganic particles to spin into a fiber form, spray into a powder form, process via rapid solidification, or cast into an ingot.

Another preferred embodiment of this method is heated pressing of the coated pellets with minimal added shear or mixing to directly form into a desired shape which is then solidified into a graphene-inorganic composite.

Another preferred embodiment of this method is sintering of the coated pellets to directly form them into a desired shape. This sintering may be done with applied pressure or in vacuum to reduce void formation. Laser sintering of the coated inorganic particles may be used to create near net shape articles in a selective laser sintering apparatus.

One significant advantage of the present invention as compared to prior art is flexibility of selecting carrier materials. Virtually any inorganic material that is solid at room temperature or at the process temperature of the energy impact device can be used as a solid carrier material to make graphene/inorganic nanocomposites. This process can be used to create graphene/inorganic composites of various form factors, including pellets, powder, continuous filaments, and various shapes according to mold/tooling shapes.

Another significant advantage of the present invention as compared to prior art is flexibility of selecting the carbon material input into the process—no size reduction in needed. Input carbon material can be graphite in a flake morphology, raw mined graphite (without any size reduction), industrial waste from graphite anodes or paper, or industrial byproducts such as needle coke. This flexibility enables significant cost reduction for industrial scale production.

Figure 5:
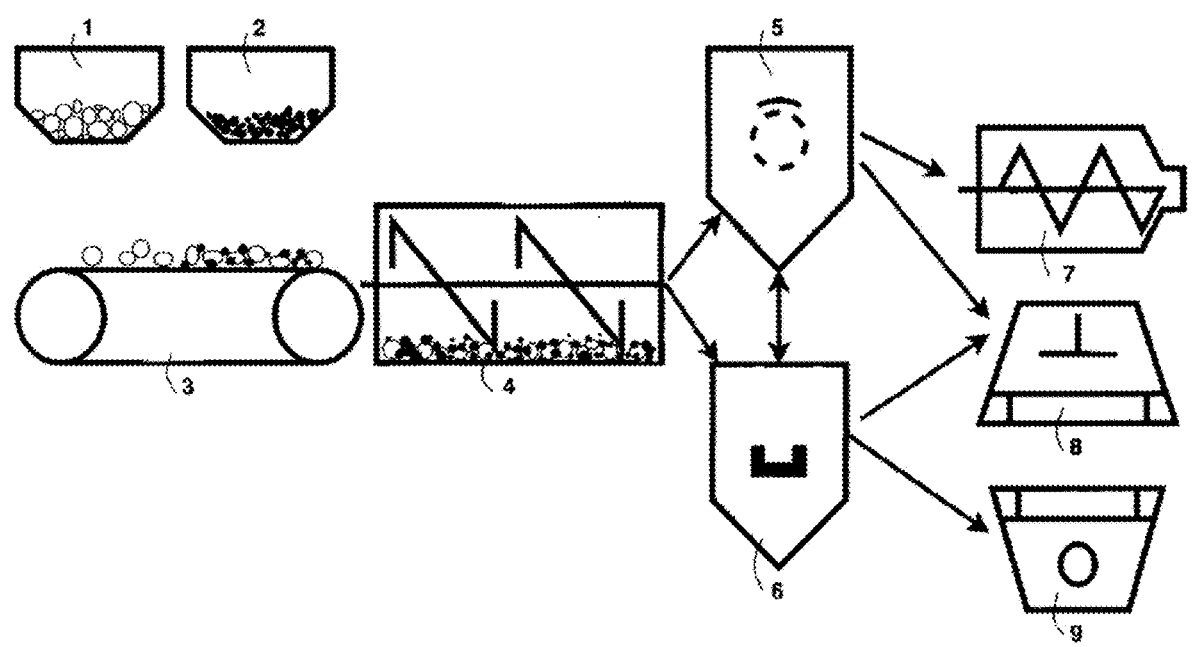
FIG. 5 A diagram showing the presently invented process for producing graphene-reinforced inorganic matrix composites via a continuous ball mill.
Figure 6A:
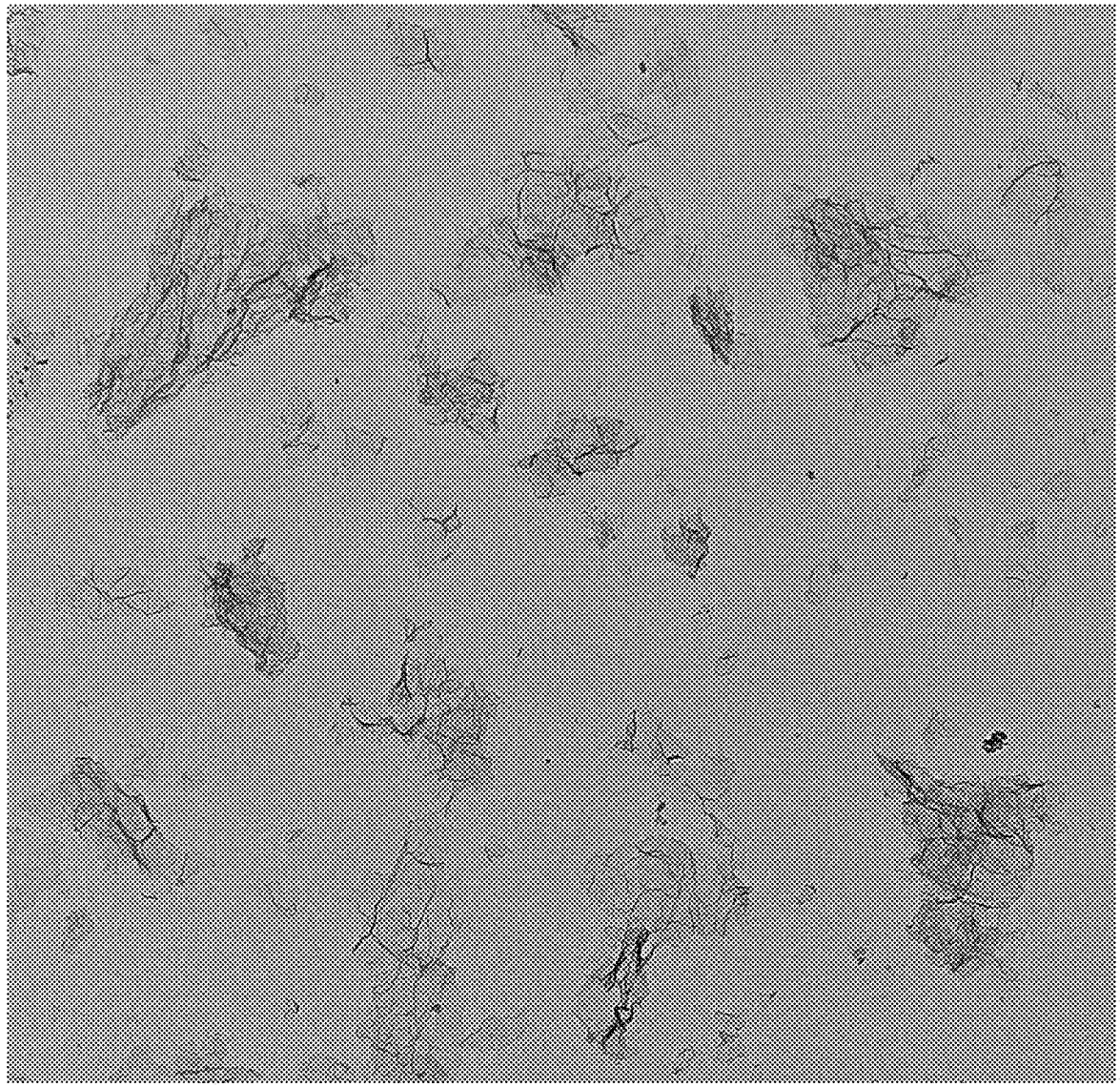
FIG. 6(A) Transmission electron micrograph of graphene sheets produced by conventional Hummer's route (much smaller graphene sheets, but comparable thickness).
Figure 6B:
FIG. 6(B) Transmission electron micrograph of graphene sheets produced by the presently invented impact energy method.

In a desired embodiment, the presently invented method is carried out in an automated and/or continuous manner. For instance, as illustrated in FIG. 5, the mixture of graphite particles 1 and solid carrier particles 2 (plus optional impacting balls) is delivered by a conveyer belt 3 and fed into a continuous ball mill 4. After ball milling to form graphene-coated solid carrier particles, the product mixture (possibly also containing some residual graphite particles and optional impacting balls) is discharged from the ball mill apparatus 4 into a screening device (e.g. a rotary drum 5) to separate graphene-coated solid carrier particles from residual graphite particles (if any) and impacting balls (if any). This separation operation may be assisted by a magnetic separator 6 if the impacting balls are ferromagnetic (e.g. balls of Fe, Co, Ni, or Mn-based metal). The graphene-coated carrier particles may be delivered into a powder classifier, a cyclone, and or an electrostatic separator. The particles may be further processed by melting 7, pressing 8, or grinding/pelletizing apparatus 9. These procedures can be fully automated. The process may include characterization or classification of the output material and recycling of insufficiently processed material into the continuous energy impacting device. The process may include weight monitoring of the load in the continuous energy impacting device to optimize material properties and throughput.

Another preferred embodiment of this method is melting of the coated inorganic pellets and spraying them into a surface to create a graphene/inorganic nanocomposite coating.

Graphene sheets transferred to carrier solid surfaces have a significant proportion of surfaces that correspond to the edge planes of graphite crystals. The carbon atoms at the edge planes are reactive and must contain some heteroatom or group to satisfy carbon valency. There are many types of functional groups (e.g. hydroxyl and carboxylic) that are naturally present at the edge or surface of graphene nano platelets produced through transfer to a solid carrier particle. The impact-induced kinetic energy experienced by the carrier particles are of sufficient energy and intensity to chemically activate the edges and even surfaces of graphene sheets coated on carrier particle surfaces (e.g. creating highly active sites or free radicals). Provided that certain chemical species containing desired chemical function groups (e.g. —$NH_2$, Br—, etc.) are included in the impacting chamber, these functional groups can be imparted to graphene edges and/or surfaces. In other words, production and chemical functionalization of graphene sheets can be accomplished concurrently by including appropriate chemical compounds in the impacting chamber. In summary, a major advantage of the present invention over other processes is the simplicity of simultaneous production and modification of surface chemistry.

Graphene platelets derived by this process may be functionalized through the inclusion of various chemical species in the impacting chamber. In each group of chemical species discussed below, we selected 2 or 3 chemical species for functionalization studies.

In one preferred group of chemical agents, the resulting functionalized NGP may broadly have the following formula(e): [NGP]—$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, $Si(-OR'-)_yR'_3$-y, $Si(-O-SiR'_2-)OR'$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

Graphene coated inorganic particles may be used as reinforcement fillers in epoxy resin, improving mechanical properties, electrical conductivity and thermal conductivity. For compatibility with epoxy resin, the functional group —$NH_2$ is of particular interest. For example, a commonly used curing agent for epoxy resin is diethylenetriamine (DETA), which has three —$NH_2$ groups. If DETA is included in the impacting chamber, one of the three —$NH_2$ groups may be bonded to the edge or surface of a graphene sheet and the remaining two un-reacted —$NH_2$ groups will be available for reacting with epoxy resin. Such an arrangement provides a good interfacial bonding between the graphene sheets wrapped around inorganic particles and the epoxy matrix.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin material at one or two other ends.

The above-described [NGP]—$R_m$ may be further functionalized. This can be conducted by opening up the lid of an impacting chamber after the —$R_m$ groups have been attached to graphene sheets and then adding the new functionalizing agents to the impacting chamber and resuming the impacting operation. The resulting graphene sheets or platelets include compositions of the formula: [NGP]-$A_m$, where A is selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N(R')_3X$, $R'SiR'_3$, $R'Si(-OR'-)_yR'_3$ $_y$, $R'Si(-O-SiR'_2-)OR'$, R'—R", R' N CO, $(C_2H_4O-)_wH$, $(-C_3H_6O-)_wH$, $(-C_2H_4O)_w$—R', $(C_3H_6O)_w$—R', R', and w is an integer greater than one and less than 200.

The NGP's may also be functionalized to produce compositions having the formula: [NGP]—[R'-A]$_m$, where m, R' and A are as defined above. The compositions of the invention also include NGPs upon which certain cyclic compounds are adsorbed. These include compositions of matter of the formula: [NGP]—[X—$R_a]_m$, where α is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]—[X-$A_α]_m$, where m, α, X and A are as defined above.

The functionalized NGPs of the instant invention can be prepared by sulfonation, electrophilic addition to deoxygenated platelet surfaces, or metallation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 96, 1839 (1965), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

Functionalization of the graphene-coated inorganic particles may be used as a method to introduce dopants into the inorganic matrix.

The following examples serve to provide the best modes of practice for the present invention and should not be construed as limiting the scope of the invention:

Example 1: Graphene Reinforced Copper Matrix Composite

In an experiment, 1 kg of copper powder, 100 grams of flake graphite, 50 mesh (average particle size 0.18 mm; Asbury Carbons, Asbury N.J.) and 110 grams of magnetic stainless steel pins (Raytech Industries, Middletown Conn.) were placed in a high-energy ball mill container. The ball mill was operated at 300 rpm for 4 hours. The container lid was removed and stainless steel pins were removed via magnetic separation. Particles of the inorganic carrier material were found to be coated with a dark layer, which was verified to be graphene by Raman spectroscopy. Carrier material was placed over a 50 mesh sieve and a small amount of unprocessed flake graphite was removed.

A 10 gram sample of the material was compacted into a disk by pressing and then sintered in a furnace with flowing argon at an appropriate temperature. An additional 10 gram sample was pressed and densified by hot isostatic pressing (HIP).

A 10 gram sample of the above material was compacted into a disk by pressing at 85 MPa and 425 degrees C., under argon. Ultrasonic energy was applied at 20 khz for 4 seconds, using a Stapla Condor ultrasonic welder, creating a densified disk.

Example 2: Functionalized Graphene Reinforced Copper-Matrix Inorganic Composite The process of example 1 was replicated with the inclusion of 50 grams of urea as a nitrogen source. The coated powder created was formed into disks using the same processes as example 1.

Example 3: Graphene Reinforced Tin Composite

In an experiment, 2 grams of 99.9% purity tin powder and 0.25 grams HOPG were placed in a resonant acoustic mill (Lab Ram, Resodyn Inc, Butte Mont.) along with stainless steel balls and processed for 5 minutes. Subsequently, the coated tin particles were compacted at room temperature, melted at 240° C., and solidified to form a graphene-reinforced tin matrix composite disk.

Example 4: Graphene Reinforced Aluminum Matrix Composite

In an experiment, 500 g of aluminum powder and 50 grams of highly oriented pyrolytic graphite (HOPC) were placed in resonant acoustic mill (Lab Ram, Resodyn Inc, Butte Mont.). The mill was operated for 20 minutes, after which the container was removed and un-processed HOPG was removed by a 50 mesh sieve. The aluminum powder was found to be coated with a dark layer, which was verified to be graphene by Raman spectroscopy.

A 10 gram sample of the material was compacted into a disk by pressing and then sintered in a furnace with flowing argon at an appropriate temperature. An additional 10 gram sample was pressed and densified by hot isostatic pressing (HIP).

A 10 gram sample of the above material was compacted into a disk by pressing at 45 MPa and 325 degrees C. Ultrasonic energy was applied at 20 khz for 4 seconds, using a Stapla Condor ultrasonic welder, creating a densified disk.

Example 5: Graphene-Glass Composite from Meso-Carbon Micro Beads (MCMBs)

In one example, 500 grams of borosilicate glass powder (carrier material) and 10 grams of MCMBs (China Steel Chemical Co., Taiwan) were placed in a ball mill, and processed for 3 hours. In separate experiments, un-processed MCMB was removed by sieving, air classification, and settling in a solvent solution. The graphene loading of the coated particles was estimated to be 1.4 weight %. Compacted samples were sintered inside a ceramic fiber enclosure (Fuzeworks, Diamond Tech Inc., Tampa Fla.) using a conventional 1200 W household microwave. A small sample of the coated glass powder was placed in an induction furnace and used to draw a glass fiber.

Example 6: Graphene-Glass Composite by Selective Laser Sintering

Out of the materials produced in Example 5 above, 200 grams of the graphene-coated glass powder was formed into tensile test bars via a selective laser sintering apparatus. These bars were then annealed to reduce thermal stresses. Coefficient of thermal expansion (CTE) and tensile strength were measured.

Example 7: Functionalized Graphene Inorganic-Matrix Composites

In separate experiments, the following functional group-containing species were introduced to the graphene-copper composites, either during the ball mill process or in a secondary ball mill step: an amino acid, sulfonate group (—$SO_3H$), 2-Azidoethanol, polyamide (caprolactam), and aldehydic group. These graphene coated powders were subsequently used as filler materials for composite materials. In general, these functional groups were found to impart significantly improved interfacial bonding between resulting graphene sheets and epoxy, polyester, polyimide, and vinyl ester matrix materials to make stronger polymer matrix composites. The interfacial bonding strength was semi-quantitatively determined by using a combination of short beam shear test and fracture surface examination via scanning electronic microscopy (SEM). Non-functionalized graphene sheets tend to protrude out of the fractured surface without any residual matrix being attached to graphene sheet surfaces. In contrast, the fractured surface of composite samples containing functionalized graphene sheets do not exhibit any bare graphene sheets; and what appears to be graphene sheets were completely embedded in a resin matrix.

Example 8: Graphene-Ceramic Composite Via Freezer Mill

In an experiment, 10 grams of titanium dioxide powder and 1 gram of graphene nanoplatelets (N006-p graphene, Angstron Materials, Dayton, Ohio) were placed in a freezer mill (Spex Mill, Spex Sample Prep, Metuchen N.J.) and processed for 10 minutes. A sample of the coated particles was compacted and subsequently microwave sintered. A second sample was combined with barium carbonate and processed in the same manner, creating barium titanate. Electrical conductivity was measured via 4 point probe.

Comparative Example 1: Graphene Via Hummer's Process and Inorganic Composite

Graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove the majority of the sulphate ions. The sample was then washed repeatedly with deionized water until the pH of the filtrate was neutral. The slurry was spray-dried and placed in a vacuum oven at 60° C. for 24 hours. The interlayer spacing of the resulting laminar graphite oxide was determined by the Debey-Scherrer X-ray technique to be approximately 0.73 nm (7.3 A). A sample of this material was subsequently transferred to a furnace pre-set at 650° C. for 4 minutes for exfoliation and heated in an inert atmosphere furnace at 1200° C. for 4 hours to create a low density powder comprised of few layer reduced graphene oxide (RGO). Surface area was measured via nitrogen adsorption BET.

This powder was subsequently dry mix at a 1%-15% loading level with copper flake, aluminum powder, borosilicate glass powder, and alumina powder, respectively via ball mill for 20 minutes duration. Compounded material was pressed to densify and sintered in an inert atmosphere at an appropriate temperature.

Summary of Testing Results:

Scanning electron microscopy (SEM), transmission electron microscopy (TEM), Raman spectroscopy, flexural strength test (both long beam test for flexural strength and modulus determination and short beam shear test for interlaminar or interfacial bonding assessment), BET test for determination of specific surface area (SSA), electrical conductivity (4-point probe) test, and thermal conductivity (laser flash) test were conducted to measure structure and properties of inorganic matrix composites. The following are a summary of some of the more significant results:

1) In general, the addition of impacting balls helps to accelerate the process of peeling off graphene sheets from graphite particles. However, this option necessitates the separation of these impacting balls after graphene-coated inorganic particles are made.
2) When no impacting particles (ceramic, glass, metal balls, etc.) are used, harder inorganic particles (e.g. alumina, sapphire, zirconia) are more capable of peeling off graphene sheets from graphite particles, as compared to softer inorganic particles (e.g. copper, tin, aluminum).
3) Without externally added impacting balls, softer inorganic particles tend to result in graphene-coated or embedded particles having 0.01% to 5% by weight of graphene (mostly single-layer graphene sheets) and harder inorganic balls tend to lead to graphene-coated particles having 0.1% to 30% by weight of graphene (mostly single-layer and few layer graphene sheets).
4) With externally added impacting balls, all inorganic balls are capable of supporting from 0.01% to approximately 80% by weight of graphene sheets (mostly few-layer graphene, <10 layers if over 30% by weight).
5) The graphene-reinforced inorganic matrix composite (graphene/inorganic nanocomposite) produced by the presently invented method typically exhibits a significantly higher flexural strength as compared to its counterparts produced by the conventional, prior art methods. SEM examination of fractures surfaces reveals much more uniform dispersion of graphene in the presently invented graphene/inorganic nanocomposites. Agglomeration of nano-fillers can be sources of crack initiation in a composite material.
6) The graphene/inorganic nanocomposites produced by the presently invented method also have a significantly lower percolation threshold. The percolation threshold is the critical volume fraction or weight fraction of a conducting filler that enables the formation of a network of electron-conducting paths in an otherwise non-conducting inorganic matrix. This is typically characterized by a sudden jump, by 15 orders of magnitude, in an electrical conductivity-vs.-filler fraction curve. For instance, the presently invented graphene/zirconia nanocomposites can exhibit a percolation threshold as low as 2.0%, but the same type of composites produced by prior art methods typically require approximately 4.5% by weight of graphene sheets to achieve the percolation threshold.
7) After low temperature processing, the graphene/inorganic nanocomposites containing chemically functionalized graphene sheets exhibit significantly higher short-beam shear strength as compared with those containing non-functionalized graphene sheets. This demonstrates the surprising effectiveness of the presently invented method of combined graphene production/functionalization.

The invention claimed is:

1. A method of producing a graphene-reinforced inorganic matrix composite directly from a graphitic material, said method comprising: a) mixing components consisting essentially of multiple particles of a graphitic material and multiple particles of a solid inorganic material to form a mixture in an impacting chamber of an energy impacting apparatus, wherein said graphitic material has never been intercalated, oxidized, or exfoliated and does not include previously produced isolated graphene sheets and wherein no impacting balls are present in said impacting chamber; b) operating said energy impacting apparatus with a frequency and an intensity for a length of time sufficient for transferring graphene sheets directly from said graphitic material to surfaces of said solid inorganic material particles, to produce graphene-coated inorganic particles inside said impacting chamber; and c) forming said graphene-coated inorganic particles into said graphene-reinforced inorganic matrix composite.

2. The method of claim 1, wherein said solid inorganic material is selected from iron, copper, aluminum, lead, tin, zinc, indium, iridium, vanadium, manganese, nickel, zirconia, technetium, silver, silicon, cadmium, gold, platinum, niobium, molybdenum, chromium, manganese, cobalt, alumina, zirconia, titanium dioxide, boron nitride, soda lime glass, lead containing glass, aluminosilicate containing glass, tellurite-containing glass, antimony-containing glass, arsenate-containing glass, titanate-containing glass, tantalite-containing glass, borosilicate-based glasses, silica, high silica content glass, amorphous silicon dioxide, quartz, fused quartz, alumina, beryllia, ceria, carbide, boride, nitride, silicide, carborundum, diamond, an alloy thereof, or a combination thereof.

3. A mass of graphene-coated inorganic particles produced by the method of claim 2, wherein a graphene proportion is from 0.01% to 80% by weight based on the total weight of graphene and inorganic particles combined.

4. The mass of graphene-coated inorganic particles of claim 3, which is fed into an extruder, a molding machine, or a selective laser sintering apparatus to make a graphene-reinforced inorganic composite part.

5. The method of claim 1, wherein said solid inorganic material is selected from zirconium barium titanate, strontium titanate (ST), calcium titanate (CT), magnesium titanate (MT), calcium magnesium titanate (CMT), zinc titanate (ZT), lanthanum titanate (TLT), and neodymium titanate (TNT), barium zirconate (BZ), calcium zirconate (CZ), lead magnesium niobate (PMN), lead zinc niobate (PZN), lithium niobate (LN), barium stannate (BS), calcium stannate (CS), magnesium aluminium silicate, magnesium silicate, barium tantalate, titanium dioxide, niobium oxide, zirconia, silica, sapphire, beryllium oxide, and zirconium tin titanate, indium tin oxide (ITO), lanthanum-doped strontium titanate (SLT), yttrium-doped strontium titanate (SYT) yttria-stabilized zirconia (YSZ), gadolinium-doped ceria (GDC), lanthanum strontium gallate magnesite (LSGM), beta alumina, lead zirconate titanate (PZT), barium titanate (BT), strontium titanate (ST), quartz, ferrites, strontium carbonate, lanthanum strontium manganite, and combinations thereof.

6. A mass of graphene-coated inorganic particles produced by the method of claim 5, wherein a graphene proportion is from 0.01% to 80% by weight based on the total weight of graphene and inorganic particles combined.

7. The method of claim 1, wherein said solid inorganic material particles include powder, flakes, beads, pellets, spheres, wires, fibers, filaments, discs, ribbons, or rods, having a diameter or thickness from 10 nm to 10 mm.

8. The method of claim 7, wherein said diameter or thickness is from 1 μm to 100 μm.

9. The method of claim 1, wherein said solid inorganic material includes micron- or nanometer-scaled particles that can be melted above a melting temperature, and said method includes a step of melting said solid inorganic carrier material for forming said inorganic matrix composites.

10. The method of claim 1 wherein said graphitic material is selected from natural graphite, synthetic graphite, highly oriented pyrolytic graphite, graphite fiber, graphitic nanofiber, graphite fluoride, chemically modified graphite, mesocarbon micro-bead, partially crystalline graphite, or a combination thereof.

11. The method of claim 1, wherein the energy impacting apparatus is a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill or resonant acoustic mixer.

12. The method of claim 1, wherein said step (c) includes melting said inorganic particles to form a melt mixture with graphene sheets dispersed therein, forming said melt mixture into a desired shape and solidifying said shape into said graphene-reinforced inorganic-matrix composite.

13. The method of claim 1, wherein said step (c) includes melting said inorganic particles to form a melt mixture with graphene sheets dispersed therein and extruding said mixture into a rod form or sheet form, spinning said mixture into a fiber form, spraying said mixture into a powder form, or casting said mixture into an ingot form.

14. The method of claim 1, wherein said step (c) includes sintering said graphene-coated inorganic particles into a desired shape of said graphene-reinforced inorganic matrix composite, wherein said sintering device may be a selective laser sintering apparatus.

15. The method of claim 1 wherein said graphene sheets contain graphene fluoride, graphene fluoride with less than 5% fluorine by weight, graphene with a carbon content no less than 95% by weight, or chemically modified graphene.

16. The method of claim 1 wherein said graphene sheets contain single-layer graphene sheets.

17. The method of claim 1 wherein said graphene sheets contain at least 80% single-layer graphene or at least 80% few-layer graphene having no greater than 10 graphene planes.

18. The method of claim 1, wherein said procedure of operating said energy impacting apparatus is conducted in a continuous manner using a continuous energy impacting device.

19. The method of claim 1 wherein said impacting chamber further contains a functionalizing agent and said step (b) of operating said energy impacting apparatus act to chemically functionalize said graphene sheets with said functionalizing agent.

20. The method of claim 19 wherein said functionalizing agent contains a chemical functional group selected from alkyl or aryl silane, alkyl or aralkyl group, hydroxyl group, carboxyl group, amine group, sulfonate group ($-SO_3H$), aldehydic group, quinoidal, fluorocarbon, or a combination thereof.

21. The method of claim 19 wherein said functionalizing agent contains an oxygenated group selected from the group consisting of hydroxyl, peroxide, ether, keto, and aldehyde.

22. The method of claim 19 wherein said functionalizing agent contains a functional group selected from the group consisting of $SO_3H$, COOH, $NH_2$, OH, R'CHOH, CHO, CN, COCl, halide, COSH, SH, COOR', SR', $SiR'_3$, $Si(-OR'-)_y R'_{3-y}$, $Si(-O-SiR'_2-)OR'$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

23. The method of claim 19 wherein said functionalizing agent contains a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

24. The method of claim 19 wherein said functionalizing agent contains a functional group selected from OY, NHY, O—C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R')_3X^-$, $R'SiR'_3$, $R'Si(-OR'-)_y R'_{3-y}$, $R'Si(-O-SiR'_2-)$ OR', R'—R", R'—N—CO, $(C_2H_4O-)_wH$, $(-C_3H_6O-)_wH$, $(-C_2H_4O)_w-R'$, $(C_3H_6O)_w-R'$, R', and w is an integer greater than one and less than 200.

25. The method of claim 19, wherein said step of operating said energy impacting apparatus is conducted in a continuous manner using a continuous energy impacting device.

26. A method of producing a graphene-reinforced inorganic matrix composite directly from a graphitic material, said method comprising: a) mixing multiple particles of a graphitic material and multiple particles of a solid inorganic material to form a mixture in an impacting chamber of an energy impacting apparatus, wherein said graphitic material has never been intercalated, oxidized, or exfoliated and does not include previously produced isolated graphene sheets; b) operating said energy impacting apparatus with a frequency and an intensity for a length of time sufficient for transferring graphene sheets directly from said graphitic material to surfaces of said solid inorganic material particles, to produce graphene-coated inorganic particles inside said impacting chamber; and c) forming said graphene-coated inorganic particles into said graphene-reinforced inorganic matrix composite, wherein a plurality of impacting balls or media are added to the impacting chamber of said energy impacting apparatus and wherein the contents of said impacting chamber consists essentially of said particles of graphitic material, said particles of inorganic material, said impacting balls or media and an inert gas.

27. The method of claim 26, wherein a magnet is used to separate the impacting balls or media from the graphene-coated inorganic particles prior to step (c) of forming said graphene-coated inorganic particles into said graphene-reinforced inorganic matrix composite.

\* \* \* \* \*